United States Patent
O'Donoghue et al.

[19]

[11] Patent Number: 5,893,134
[45] Date of Patent: *Apr. 6, 1999

[54] ALIGNING SOURCE TEXTS OF DIFFERENT NATURAL LANGUAGES TO PRODUCE OR ADD TO AN ALIGNED CORPUS

[75] Inventors: Timothy Francis O'Donoghue; Thomas Juliusz Wachtel, both of England, United Kingdom

[73] Assignees: Canon Europa N.V., Netherlands; Canon Research Centre Europe Limited, England

[ * ] Notice: This patent issued on a continued prosecution application filed under 37 CFR 1.53(d), and is subject to the twenty year patent term provisions of 35 U.S.C. 154(a)(2).

[21] Appl. No.: 650,967

[22] Filed: May 21, 1996

Related U.S. Application Data

[63] Continuation of Ser. No. 143,120, Oct. 29, 1993, abandoned.

[30] Foreign Application Priority Data

Oct. 30, 1992 [GB] United Kingdom .................... 9222768

[51] Int. Cl.$^6$ ...................................................... G06F 17/28
[52] U.S. Cl. ................................ 707/536; 707/513; 704/8
[58] Field of Search .................................... 395/774, 802, 395/803, 752, 753, 757, 760; 707/513, 523, 524, 536; 704/8, 9

[56] References Cited

U.S. PATENT DOCUMENTS

| | | | |
|---|---|---|---|
| 4,599,612 | 7/1986 | Kaji et al. | 340/723 |
| 4,734,036 | 3/1988 | Kasha | 434/157 |
| 4,791,587 | 12/1988 | Doi | 364/900 |
| 4,965,763 | 10/1990 | Zamora | 364/900 |
| 5,331,556 | 7/1994 | Black, Jr. et al. | 704/9 |
| 5,351,189 | 9/1994 | Doi et al. | 364/419.02 |
| 5,442,546 | 8/1995 | Kaji et al. | 704/4 |
| 5,587,902 | 12/1996 | Kugimiya | 704/2 |
| 5,640,587 | 6/1997 | Davis et al. | 345/348 |

FOREIGN PATENT DOCUMENTS

| | | |
|---|---|---|
| 499366 | 8/1992 | European Pat. Off. . |
| 525470 | 2/1993 | European Pat. Off. . |
| 264971 | 9/1992 | Japan . |
| WO 9010911 | 9/1990 | WIPO . |

OTHER PUBLICATIONS

Simpson, *Mastering WordPerfect 5.1 & 5.2 for Windows*, Sybex 1992, 1993.
Borzo, "WordPerfect Update to Offer Mail Support," Info World, Oct. 19, 1992, vol. 14, No. 42, pp. 1–2.
van Herwijner, *Practical SGML*, p. 13, Jan./1990.
"Aligning Sentences In Parallel Corpora", association of computational Liguistics, conference Berkeley 1991, pp. 169–176, P.F. Brown et al.
"A Program For Aligning Sentences In Bilingual Corpa", ACL Conference Berkeley 1991, pp. 177–184, W.A. Gale et al.
(Paper in French) "La comparaison de grands corpus multilingues comme instrument lexicographique: exemple d'un dictionnaire hebreu–anglais–hebreu etabli semi–automatique", pp. 69–73, Sprueche und Datenverarbeitung, vol. 12, No. 2, 1988, J. Bajard.
Computational Linguistics, vol. 19, No. 1, Mar. 1993, US pp. 75–102, W.A. Gale & K.W. Church, "A Program For Aligning Sentences In Bilingual Corpra".
IEEE Expert, vol. 7, No. 5, Oct. 1992, Los Alamitos, CA, US, pp. 27–35, B. Moulin & D. Rousseau, "Automated Knowledge Acquisition From Regulatory Texts".

*Primary Examiner*—Joseph R. Burwell
*Attorney, Agent, or Firm*—Fitzpatrick, Cella, Harper & Scinto

[57] ABSTRACT

A plurality of source text files are read, representing similar information but in different natural languages. The files have correlated layouts, in that the same layout commands are employed at similar points in the files. Similar text, from the respective files, is aligned by identifying its position between equivalent word processing commands. Preferably, intermediate files are produced in which the word processing (WP) commands are converted into an identifiable form. Aligned text, which differs between the intermediate files whereas WP commands will not differ, is identified by a differential comparison operation, such as a call to DIFF within a UNIX environment.

15 Claims, 5 Drawing Sheets

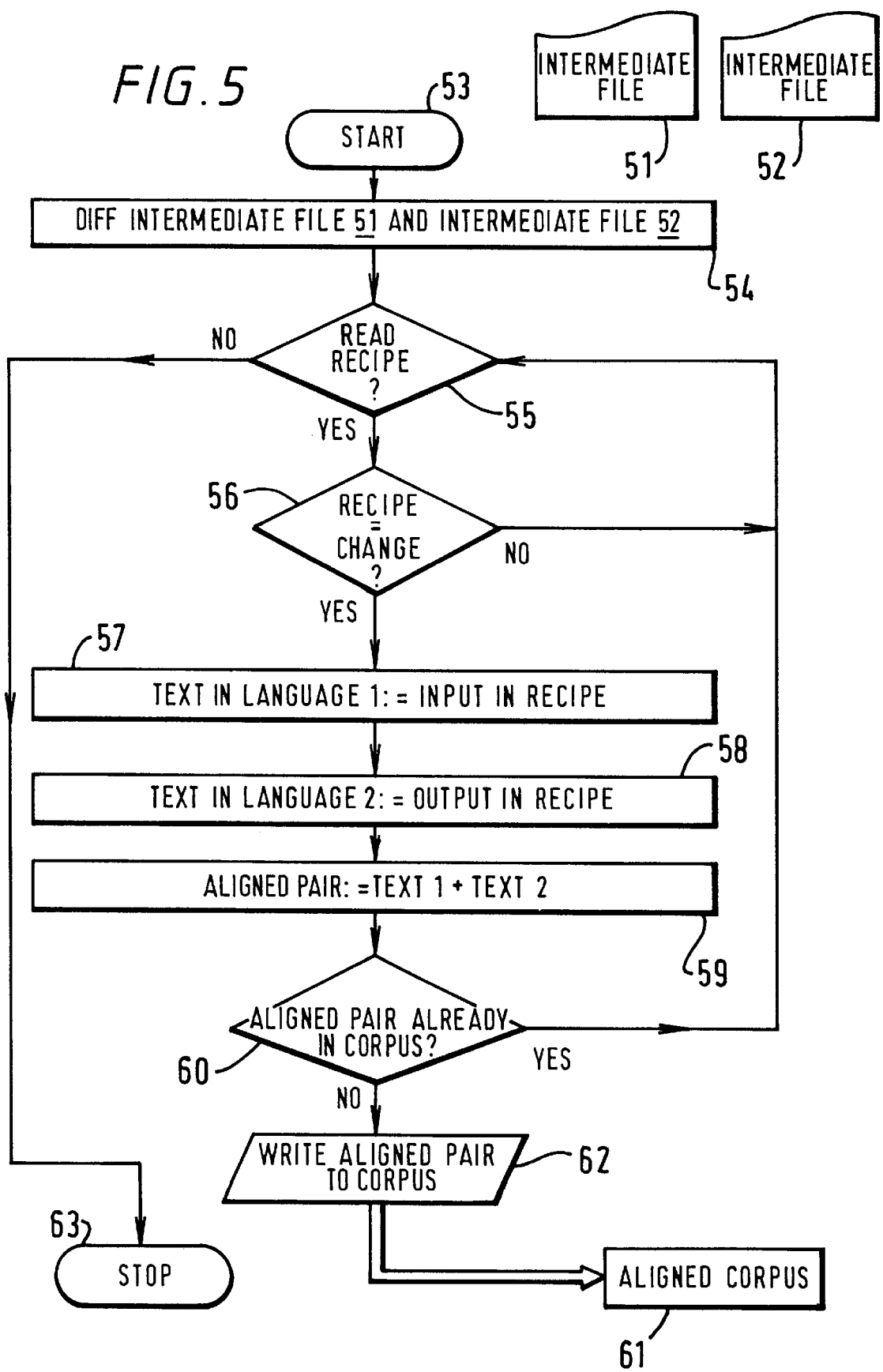

ALIGNING SOURCE TEXTS OF DIFFERENT NATURAL LANGUAGES TO PRODUCE OR ADD TO AN ALIGNED CORPUS

This application is a continuation of application Ser. No. 08/143,120, filed Oct. 29, 1993, now abandoned.

FIELD OF THE INVENTION

The present invention relates to a system for aligning source texts of different natural languages to produce, or add to, an aligned corpus.

BACKGROUND OF THE INVENTION

An aligned corpus consists of words, phrases and sentences in a first language, mapped onto substantially similar words, phrases or sentences in a second language. The aligned corpus is used in automated translation systems in which, given a word, phrase or sentence in a first language, the equivalent in the second language may be obtained. Similarly, given a word, phrase or sentence in the second language, its equivalent in the first language may be obtained. This principle may be extended, such that a multi-lingual system may be provided, so that, given a word, phrase or sentence in any of the languages available, all the others may be translated simultaneously.

A system for translating text is shown in FIG. 1 and provides an environment for employing an aligned corpus.

Operating instructions and data from the aligned corpus are supplied to a processing unit 15 from a hard magnetic disk drive 16. A floppy disk drive 17 receives floppy disks containing an input text, in a first language, and also receives data relating to an output text in a second language, which is written to a separate file on the floppy disk. At the end of the process, the floppy disk holds the original file of the input text plus, in a separate file, the translated output text.

In the 1950s and 60s it was a common belief that the development of an all purpose translating system would become available in the not too distant future. It was then realised that such a system was much further off and possibly would never be implemented, given the problem of including sufficient background information, to facilitate intelligent translation. However, it was also appreciated that the problem of providing translation within a smaller specalised field would be possible, given that many words which have many different meanings, would tend to have a much limited range of meanings within the confines of a specialist field of activity.

However, a problem of creating a translation system for operation within a specialist field of activity is that of generating aligned corpora, given that a corpus generated for one field of activity would probably not be suitable for application in another field of activity. Thus, it would be necessary for users working in each field to generate their own corpora. Consequently, this problem has tended to negate the use of such automated systems and reliance continues to be made upon human translators.

The systems shown in FIG. 1 could be used, rather than a replacement to a translator, as an assistant to a translator. Thus, each sentence, or part of a sentence, could be displayed on an output device, such as a visual display unit 18, while information could be supplied to the processing unit 15 via an input device, such as a keyboard 19.

The operation of such a system could be in the form as shown in FIG. 2. As previously stated, an aligned corpus 21 is resident on the hard magnetic disk drive 16, or similar device, an input file is resident on the floppy disk drive 17, or similar device and the output file is written, after being generated by the processing unit 15, to the floppy disk drive 17. In an alternative arrangement, two floppy disk drives could be provided and the output file could be written to the second drive. Alternatively, the output file could be written to the hard disk drive unit 16 or to any other suitable storage device.

Documents are processed on a page by page basis. The flow chart shown in FIG. 2 therefore describes operation of the system with reference to a single page. A page may be loaded which does not actually contain any information and it is important that the system does not become locked-out when it has no information to process. At step 24 the question is posed as to whether the end of the page has been reached. If yes, the process stops at step 25. Normally, the page will contain text, therefore the first sentence of the input file is read at step 26. An enquiry is now made to the aligned corpus 21 to ask whether the sentence under consideration is present within the corpus, at step 27. If the input sentence is present in the corpus, the aligned output sentence is returned from the corpus and at step 28 the translated form of the sentence is written to the output file. In one embodiment, the operator may be asked to check the translation, by means of the translation being supplied to the visual display unit 18, before the data is actually written to the output file. However, in the embodiment detailed in FIG. 2, the translation is made automatically, so as to improve processing speed.

If, in response to the enquiry made at step 27, the input sentence is not present in the corpus, the operator is prompted to provide an input, via the keyboard 19, of the correct translation, at step 29. At step 30, the translation provided by the operator is written to the destination file and an enquiry is made to the operator, at step 31, enquiring as to whether the new translation should be added to the corpus. If the operator responds in the affirmative, the new alignment is added to the corpus at step 32. If the operator's response is negative, step 32 is ignored.

Thus, in response to each requirement to translate a sentence, three responses become possible. In the first, the translation is present in the corpus and the translation is automatically written to the output file. Alternatively, the sentence is not present in the corpus, an input is provided by the operator and the translation is then added to the corpus after being written to the output file. Thirdly, the sentence is not present in the corpus, again an input is provided by the operator but this time the new translation is not added to the corpus.

After writing a sentence to the output file, operation returns to step 24, at which time the enquiry is made again as to whether the system has reached the end of the page. Again, if the response to this enquiry is affirmative, another sentence is read at step 26 and the procedure is repeated. At the end of the page, as previously stated, the procedure stops at step 25.

Thus, it can be seen that, on the assumption that similar subject matter is being translated repeatedly, the system will learn and entries within the corpus will expand. The knowledge base of the corpus will increase and, eventually, an operator providing manual translations will no longer be required and an operator of minimal skill may be allowed to take over. Possibly, several systems may run in parallel and a manual translator may be required occasionally to assist non-skilled operators.

A problem with the system shown in FIG. 2 is that it may take a significant resources to build up the corpus to the point where the non-skilled operator may take over. Initially, it is likely that use of the system will actually take longer than a straight forward manual translation. Furthermore, it is also highly likely that systems, possibly operating within the same office, will develop differently, with a corpus on one being significantly different from a corpus on another, such that operators would appear to be working at different rates, again leading to further unpredictability.

Methods for automatic generation of aligned corpora have been described for example by W A Gale and K W Church in "A Program for Aligning Sentences in Bilingual Corpora", and by P F Brown Et Al in "Aligning Sentences in Parallel Corpora", both in the Proceedings of the 29th Annual Meeting of the Association for Computational Linguistics, Berkeley Calif. In these systems, the portions used correspond to sentences, and alignments is performed by comparing the lengths of sentences, either in the number of words (Brown Et Al) or the number of characters (Gale and Church).

Both of these references exploit the availability of the Canadian Hansard in two languages, French and English. Brown Et Al further exploit the presence of descriptive mark-up codes in the Hansard texts, for example codes indicating the times of speeches, the names of the speakers and so on. These codes are used to define anchor points in the text, and preference is given to sentence alignments which preserve the alignment of the anchor points. Of course, descriptive markers are not available in documents in general, and are not often in a common language, even when they are present.

It is an object of the present invention to provide an improved system for generating useable aligned corpora. It is also an object of the present invention to provide a plurality of copies of corpora which may be used efficiently within a translating environment.

The inventors have recognised that, in many cases, the similar documents which are to be used as the source texts are availabe in a form which contains presentational formatting data, for example specifying the size or font to be used for output, indentations, tabulations and other layout attributes. Provided that the two source documents have similar presentational attributes, formatting data included in the source files can be used to assist in the alignment.

Accordingly, a first aspect of the invention provides methods and systems for aligning source texts of different natural languages to produce or add to an aligned corpus, wherein source text files representing similar informaion in different natural languages are read, and information aligning similar text portions from respective files is recorded, characterised in that said source text files have similar presentational attributes, and in that the alignment is performed with reference to presentational formatting data present within said text files.

The formatting data may be non-textual data, for example word processing commands. Where different word processors have been used and generate different, possibly non-textual formatting commands, these may be converted to generic forms prior to performing the alignment.

If the formatting data are converted to textual forms prior to performing the alignment, standard text file comparison means can be used to identify alignments.

As an alternative to aligning sentences, it may be advantageous for certain classes of documents to use the formatting data actually to delimit the aligned text portions.

Thus the problem of generating an aligned corpus is effectively resolved by making use of texts in machine readable form. In particular, reliance is made upon correlated texts in different natural languages. Two texts are considered to be correlated, as defined herein, when they convey the same information but in different natural languages. In addition, each page of the correlated texts may contain substantially the same information, but in different languages, laid out in a similar format. Thus, titles, tables, character modifications, may all be present at substantially similar positions.

The invention can be of particular use in the production of multi-lingual product documentation. Many products are sold with sophisticated documentation, explaining exactly how the product operates. Sometimes, such documentation may run to many hundred pages and must be generated in many different natural languages. Consequently, the cost of producing such documentation becomes a significant part of the total cost for the product itself. Furthermore, the time incurred in generating such documentation may result in a significant delay being introduced between the date on which the product is available for market and the date on which the technical manual is available to accompany the product. This often results in badly written and badly translated documentation, in an attempt to get the product to market early. Alternatively, further delay may result in potential sales being lost to competitors.

Many organisations have produced a large number of manuals, in which each translation is correlated to the original text. Thus, for each translation, the same WP system has been used as for the original and the same formatting has been used. Thus, each page of the manual in a first language looks, at first sight, similar to the equivalent page in the equivalent manual of a different language, in that headings, paragraphs and drawings etc. all appear in more or less the same place. However, the actual words within the text are different, in accordance with a particular natural language being used. It is therefore apparent that a great deal of source material is often available which, employing the present invention, may be used to produce aligned corpora which are immediately useable by unskilled operators. Furthermore, such a procedure will produce corpora that are consistent, thereby ensuring that all machines using copies of the same corpus are equivalent.

In certain embodiments, each word processor (WP) file is converted into an intermediate file, in which data relating to specific WP commands, unique to a particular WP system, are converted into a general identifiable form. Thereafter, reference is made to the identifiable WP commands, as a means of aligning the text held between the layout commands, which have been placed into identifiable form.

In a preferred embodiment, different WP commands for different WP systems are converted to similar identifiable commands in the respective intermediate file. It is then possible to identify alignable text by comparing files to identify differences between the files, wherein identifiable WP commands are not different between the files. Text portions identified as being different are written to the aligned corpus.

The invention yet further provides methods and apparatus for automatic translation, wherein information of alignments between text portions has been generated and stored by use of the invention as set forth above.

DETAILED DESCRIPTION OF A PREFERRED EMBODIMENT

Figure 1:
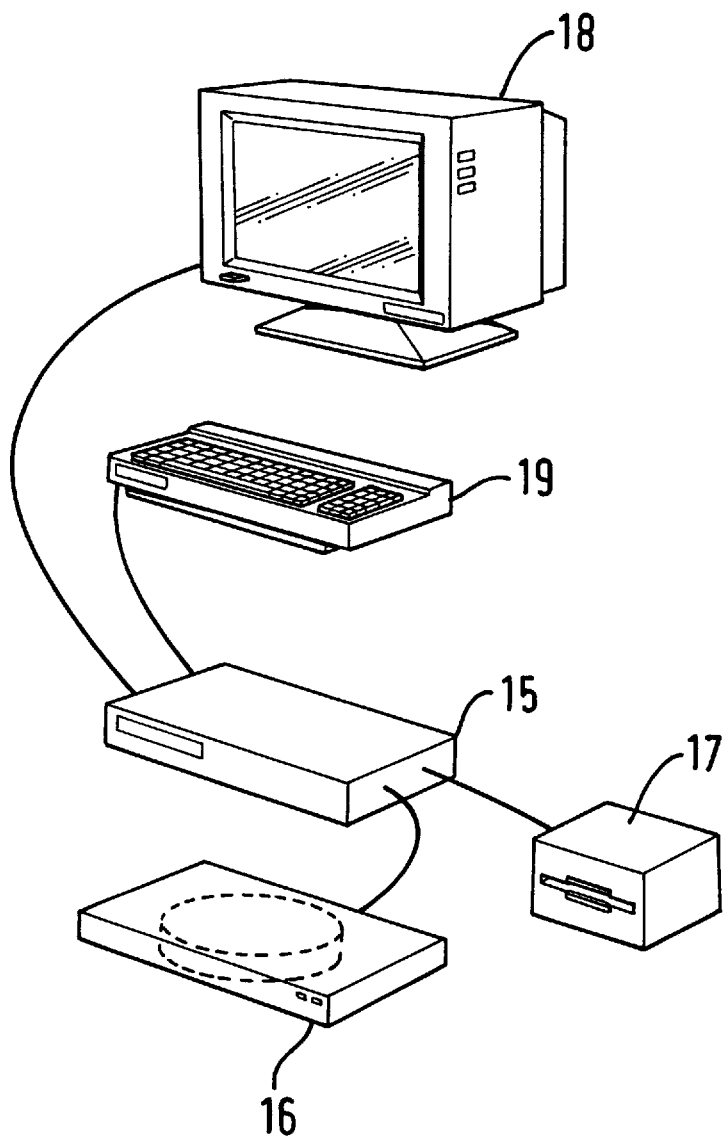
FIG. 1 shows a system for the automatic translation of text.

Operation of the system for generating an aligned corpus, in accordance with the present invention, may be performed using hardware substantially equivalent to that shown in FIG. 1, in which processing is performed on the processing unit 15, in response to instructions received from the hard magnetic disk drive 16, or similar device, with output data being written to said disk drive 16 or to the floppy disk drive 17, or similar device.

Figure 3:
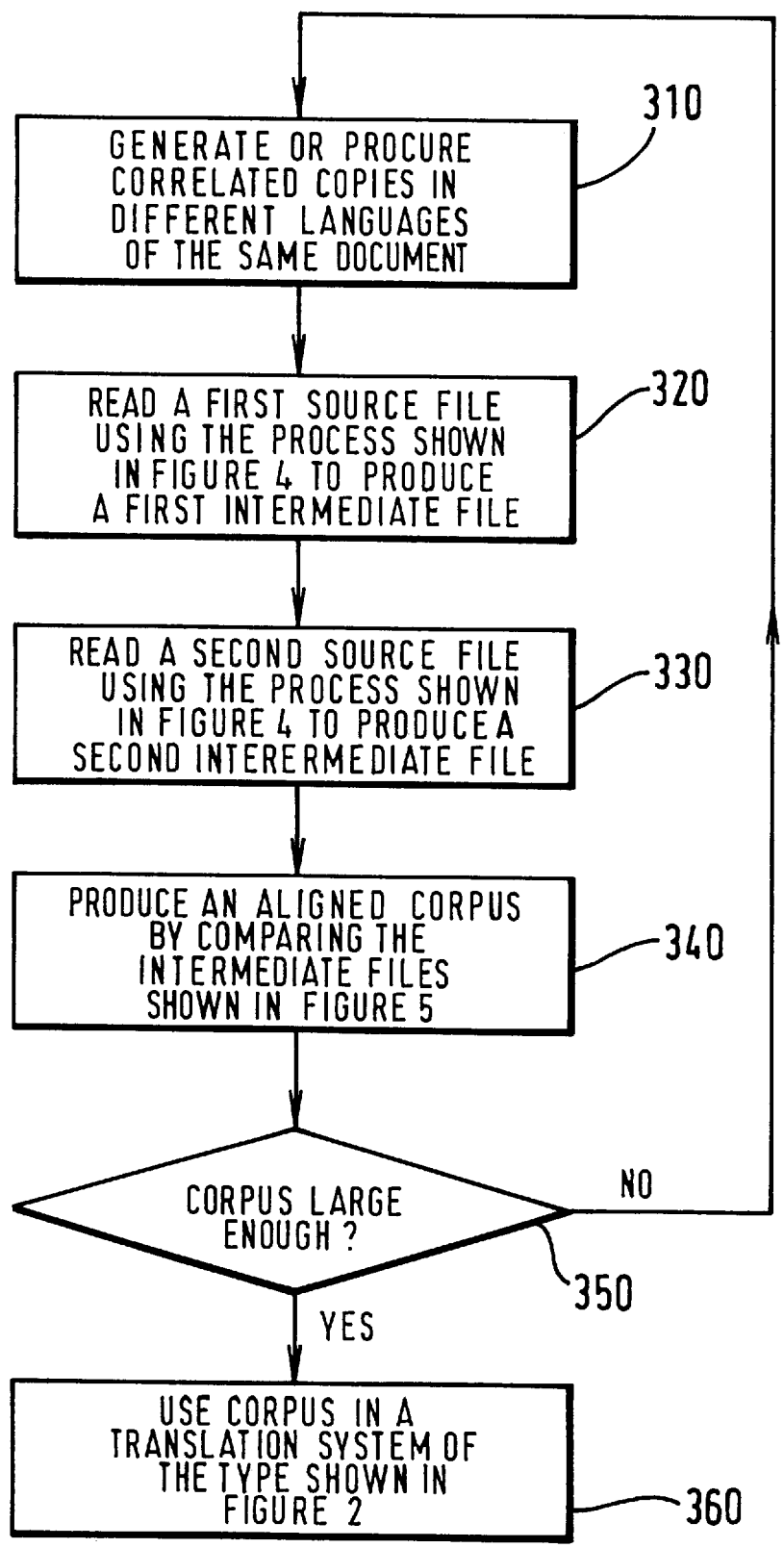
FIG. 3 shows an overview of the present invention, including the creation of intermediate files and the comparison of intermediate files.

Operation of the system for generating an aligned corpus is detailed in FIG. 3.

At step 310 it is necessary to generate or procure correlated copies in different languages of the same documentation. In some situations, this documentation may not be available. Thus a decision must be taken to the effect that all documentation in the future, where translations in several different languages are required, should be produced in correlated form, that is to say, the layout of all versions should be similar, so that the WP files contain substantially the same WP-specific commands, with only the text contained within these commands being actually different, due to the text being written in different natural languages.

In many situations, text of this type may already be available and rapid progress may be made, using the invention, towards building extensive corpora. In particular, texts may have been produced which relate to subject matter similar to that to which a corpus is bieng produced for. Thus, machine manuals may have been produced relating to particular types of machines in which, although developments have been made and modifications introduced, the terminalogy would tend to be consistent therefore, not only does this text provide for the rapid creation of a useful corpus, it also ensures that terminalogy used for subsequent models is consistent with the terminology used previously.

In this example, it is assumed that a corpus is being formed which aligns sentences, phrases and words of two languages, although as previously stated, sentences, phrases and words of more than two languages may be aligned.

Figure 4:
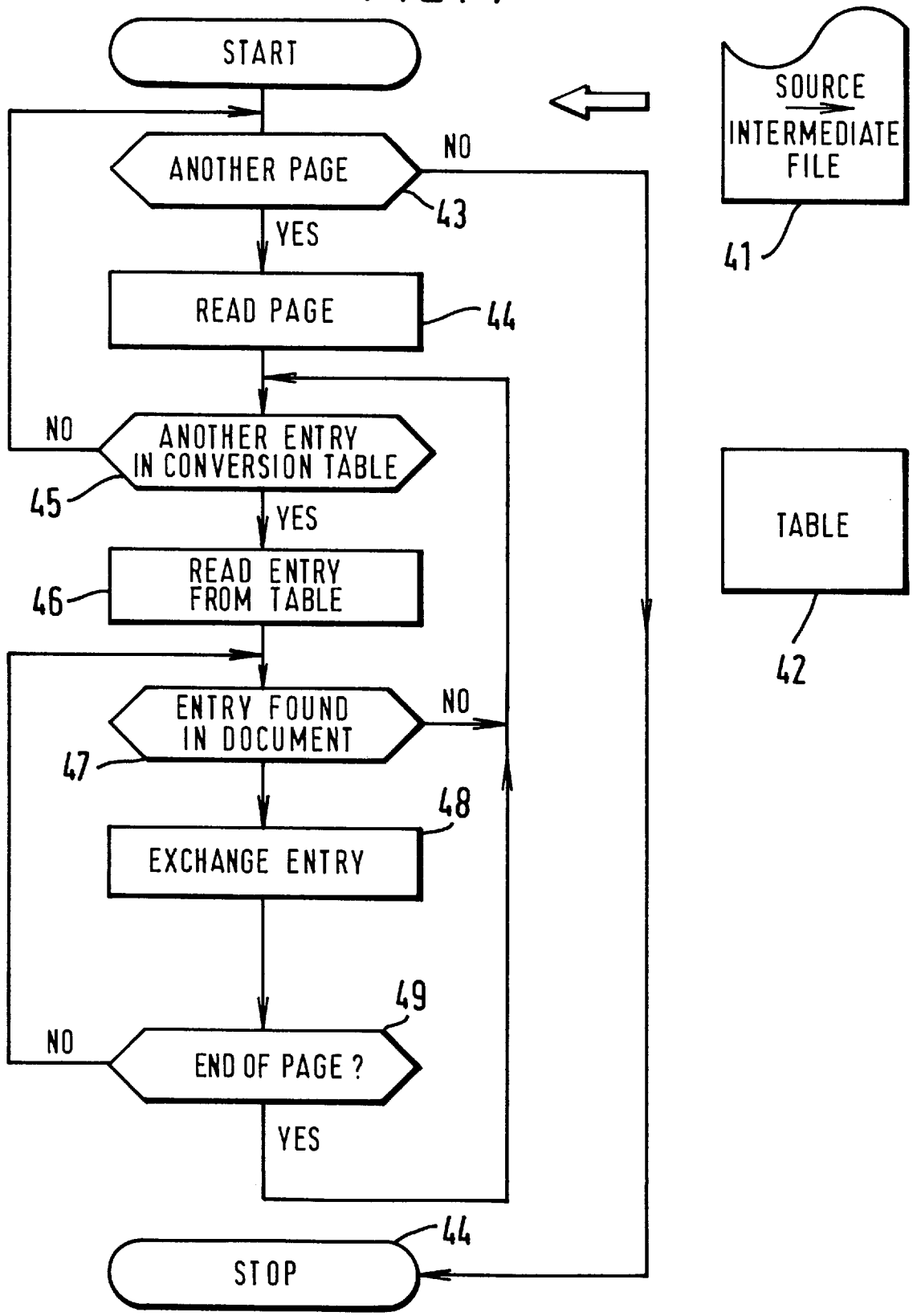
FIG. 4 details the operation of a first stage of the preferred embodiment, concerning the creation of intermediate files; and, FIG. 5 details the operation of a second stage of the preferred embodiment, concerning the creation of an aligned corpus by the comparison of intermediate files

At step 320 a first source file is read using the process detailed in FIG. 4 to produce a first intermediate file. An intermediate file is a file in which the WP-specific commands have been translated into characters which lie within the range of printable characters in the character set, such as the ACSII character set, and de-limited by a character (or sequence of characters) identifying them as such. A table is provided to map WP-specific commands onto identifiable character strings. Thus, when using different WP systems, it is only necessary to amend entries in this table and modifications to the rest of the system are not required.

At step 330 the process shown in FIG. 4 is repeated to produce a second intermediate file from the second source file. Thus, after completing this step, two intermediate files are available, derived from the first language and the second language respectively. At step 340 the system shown in FIG. 5 is employed to compare the intermediate files to produce an aligned corpus. Thereafter, at step 350 the question is posed as to whether sufficient data has been supplied to the corpus and if this question is answered in the negative, the procedure returns to step 310 and reads another pair of correlated documents. Thus, the number of iterations may be dependent upon the number of input files available or if many files are similar, fewer than all of them may be processed. Again, it is also possible that insufficient input files are available to produce a corpus of any value and processing may have to be put on hold until further correlated copies become available.

Once the corpus has been generated and an affirmative answer may be given to the question raised at step 350, the corpus may be used in a translation system of the type previously described with reference to FIG. 2, as stated by step 360.

Thus, the generation of an aligned corpus essentially consists of two stages. The first stage produces intermediate files, in which WP commands are converted into an identifiable form and the second consists of comparing correlated intermediate files to produce entries for the aligned corpus.

WP data files produced by word processing systems contain printable characters, non-printable characters and other non-character data. The file is effectively a sequence of bytes, with each byte representing a character or some other type of data. At step 320 and 330 of the system shown in FIG. 3 ASCII characters defining text are retained in unmodified form. Given that ASCII codes, or similar codes, form the basis of many WP systems, the code used for each textural character will tend to be the same for each WP system. Thus, during the generation of intermediate files, textual characters are not modified and these characters provide the basis for defining alignments which may be supplied to the aligned corpus.

In alternative embodiments, codes other than ASCII may be used, such as EBCDIC, BCDIC or a 16-bit character set such as UNICODE.

Unlike the textual characters, the command characters tend to be used in a way which is specific to any one word processing system. The choice of which characters are used for a particular representation is purely arbitrary. The characters will be generated when the file is being created. Then, when the file is being printed, the characters will be interpreted by the WP system in order for suitable instructions to be supplied to a printer. Usually, each WP system includes a plurality of programs, usually referred to as printer drivers, which ensure that, in response to the control commands generated by the WP system, commands appropriate to the specific make of printer being used are sent to said printer so as to obtain the desired effect.

In the intermediate files, WP commands have been converted into a common identifiable form so as to delimit blocks of text which can be aligned with a similar block of text in the parallel correlated file. The following is a simplified version of a typical input file:

(a) code—LARGE TEXT
   code—UNDERLINE TEXT
   text 1
   code—NORMAL SIZE
   code—PARAGAPH
   text 2
   text 3
   text 4

The string of characters in this example first of all includes a code specifying that the following text is to be increased in size, say, for the purpose of providing a heading. A subsequent code states that the following text is also to be underlined. Thereafter, the string includes a code instructing the interpreter to set character size back to normal size, followed by another code specifying the start of the paragraph.

An intermediate file is generated from the above and consists of the following:

(b) <LT>
    <UL>
    text 1
    <NS>
    <PA>
    text 2
    text 3

The unprintable codes are converted into printable strings and placed within angled brackets, or any other identifying delimiters, so as to identify them as such. Thus, the code for large text becomes LT within angled brackets and, similarly, the code for underline text becomes UL within angled brackets.

The text is left unmodified, as it is these portions of the intermediate files which will be supplied to the aligned corpus. The characters placed within angled brackets do not need to convey any information as such. The purpose of these characters is to provide alignment between the two intermediate files, in that a pair of intermediate files derived from correlated input files, will both include similar sets of WP commands.

Thus, considering two intermediate files derived from correlated texts, each intermediate file will be initiated by the commands LT and UL within angled brackets. This label is then used as a means of aligning the subsequent text. That is to say text 1 of a first intermediate file will be aligned with text 1 of a second intermediate file.

A system for generating intermediate files is shown in FIG. 4. Each source file 41 may include many pages and the file is processed on a page by page basis. The file 41 may be in any language therefore, when processing the two source files, the same system may be used for each. The system of FIG. 4 is concerned with the WP commands, wherein, as previously stated, characters lying outside the printable ASCII range and WP commands are converted to character strings lying within said range, with the addition of angled brackets to identify them as such. Table 42 is dependent upon the type of WP system being used and, when using a different WP system, it is necessary to replace table 42. Table 42 would, therefore, be stored as a separate file on disk 16 for example and during operation, the specific table required is selected by a call to the table file.

Figure 2:
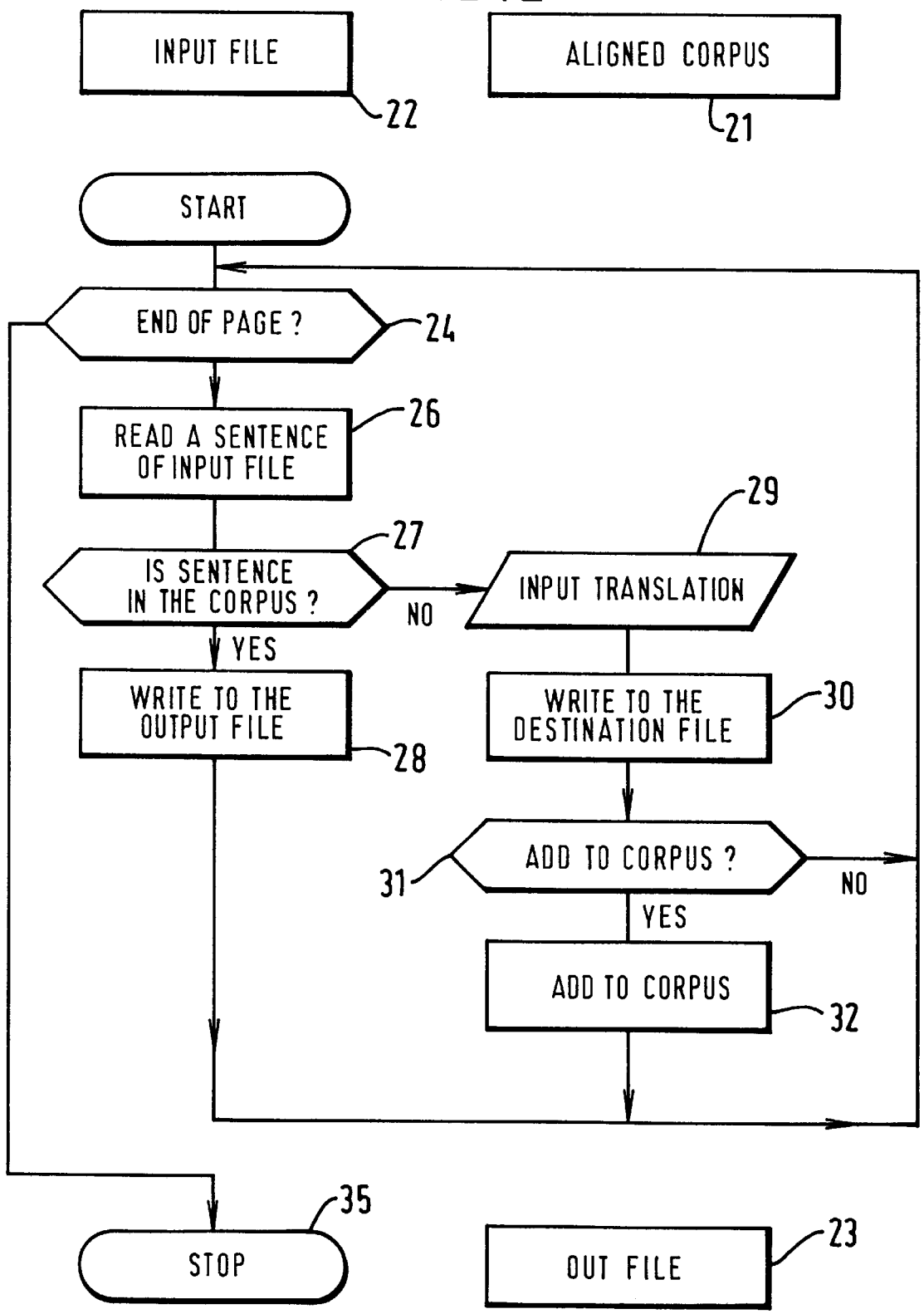
FIG. 2 illustrates the operation of the system shown in FIG. 1.

File 41 is the source input file and a system shown in FIG. 2 is not arranged to generate a separate intermediate file. The intermediate file is generated by modifying entries in the source file, such that the intermediate file generated after completing the procedure in FIG. 4, occupies the same memory locations as the initially read source file 41.

It is possible, although unlikely, that an input source file 41 could be blank, therefore it is important that the system shown in FIG. 4 does not fail due to an inability to identify data within the file. At step 43 the question is raised, therefore, as to whether another page exists within file 41 and if this question is answered in the negative, operation of the system stops at step 44. If another page is waiting in file 41, the question at step 43 is answered in the affirmative and at step 44 the page is read.

Systems for exchanging one entry for another are known as such and usually, exchanges of this type are made by looking sequentially at an input string and, as each new character arrives, a comparison is made with entries in a look-up table to see whether an exchange can be made. In the present application, however, it was appreciated that such an approach would cause problems, given that different tables 42 are required for different word processing systems. It therefore becomes attractive to perform the operation the other way round. Thus, the whole page is held in memory and table values stored within table 42 are read sequentially. Thus, the first value in table 42 is read and the whole page is scanned to see whether this value exists in the file. If the value does exist in the file, entries are exchanged. That is to say, the WP-specific value is replaced by the new value read from table 42.

Thus, at step 45 the question is raised as to whether another entry exists in the conversion table 42. Initially, this question must be answered in the affirmative, therefore the first entry from table 42 is read at step 46. At step 47 a question is raised as to whether the entry read from table 42, a WP-specific entry has been found in the page read from file 41. If, after scanning the whole page, no such entry is found, the question raised at step 47 is answered in the negative and the enquiry at step 45 is raised again, as to whether another entry is present in the conversion table. If an entry is found in the page, the exchange is made at step 48 and at step 49 the scanning process continues by the question being rasied as to whether the end of the page has been reached. If no, scanning continues by returning to step 47, enquiring as to whether the entry is present in the document. Thus, a complete scan for the entry is made and the scanning process completed by an inability to find an entry, detected at step 47 or by the end of the page being reached, identified at step 49.

After the page has been scanned for an entry in table 42, the question at step 45 is raised again, as to whether another entry is present in the conversion table. After all the entries in the conversion table have been scanned through the page under consideration, the question raised at step 45 is answered in the negative followed by the repeat of the question raised at step 43, as to whether another page is present. If another page is present, this is read from the file 41 and the process is repeated. Eventually all of the pages will be read from the file 41 and the question raised at step 43 will be answered in the negative, resulting in the process stopping at step 44.

The system for producing an aligned corpus, defined at step 44 in FIG. 3 is detailed in FIG. 5.

The system described with reference to FIG. 4 has been used twice to create two intermediate files 51, 52. The intermediate files are derived from correlated parallel files written in different natural languages, supplied to the system via floppy disks and floppy disk drive units 17.

The system is initiated at step 53 whereafter, at step 54, the two intermediate files 51, 52 are compared by the apparatus under control of a differential file comparator program, of the type commercially available. For example, a suitable file comparator program is DIFF, which is provided with and is callable from UNIX operating systems.

DIFF reports differences between two files, which is expressed as a minimal list of line edits (or recipes) required to bring either file into agreement with the other. The intermediate files 51, 52 provide inputs to a DIFF call, which in turn produces a list of recipes required to convert lines of file 51 to lines of file 52. Thus, lines which do not require any modification will be those containing the WP formatting commands which are common between the two intermediate files. Similarly, lines containing corresponding pieces of text will required changes to be made between the files. Thus, the DIFF program will identify lines which do differ between the two files, which in turn represent lines which may be written to the aligned corpus 61.

Three types of recipes are produced by the DIFF program in its comparison of the two intermediate files, consisting of a "delete", an "append", and a "change".

A "delete" recipe marks a piece of text or WP formatting command in the intermediate file 51 as not being present in the intermediate file 52. Such recipes are ignored by the system, since they do not provide any useful alignment data.

An "append" recipe marks a piece of text or WP formatting command in intermediate file 52 as not being present in intermediate file 51. Similarly, these "append" recipes are ignored by the system since they do not provide any useful alignment data.

A "change" recipe will mark a piece of text from intermediate file 51 and a matching piece of text from intermediate file 52. It is these "change" recipes which provide useful alignment data.

The "change" recipe identifies a range of lines in intermediate file 51 as being different from a similar range of lines in intermediate file 52. This difference exists because, although the information content is the same, the text for files 51 and 52 are in different languages.

Thus, the alignment is possible because text which is to be aligned, representing the same information in different languages, is actually different and these differences can be identified between the two files. However, portions of text which are identified as being different may therefore be aligned, are identified by the delimiters within the text file. Unlike the text, these delimiters would be substantially equivalent between the two files, given that equivalent formatting commands were used. Thus, portions of the text which are equivalent are used to separate portions of the text which are identified as being different and these portions of the text which are identified as being different then provide the basis for providing input to the aligned corpus.

The output of step 54 consists of a list of recipes produced by the DIFF program for the intermediate files 51, 52. Each recipe is read in turn at step 55 and if no more recipes are present, the procedure terminates at step 63. If a recipe is available to be read, it is read and checked at step 56 to see whether it is a "change" recipe. If it is not a "change" recipe, the procedure returns to step 55 and reads the next recipe. If it is a "change" recipe, step 57 extracts the text of language one from the recipe and step 58 extracts the text of language two. From the texts of languages one and two derived from steps 57 and 58, an aligned pair of corresponding texts if formed at step 59.

At step 60, a comparison is made as to whether this alignment already exists in the aligned corpus 61. If the entry does already exist, resulting in an affirmative answer to the question raised at step 60, the alignment is ignored and the process repeated for the next recipe. If the question raised at step 60, as to whether the alignment already exists in the corpus, is answered in the negative, the alignment is written to the corpus.

It can be seen, therefore, that by providing a substantial number of intermediate files, created using the system detailed in FIG. 4, the system shown in FIG. 5 will generate an aligned corpus which may be used in combination with the system shown in FIG. 2. Maximum benefit is gained from the system when source files, used to generate intermediate files and subsequently used to create the aligned corpus, relate to similar subject matter as source files which are to be translated by the system. Thus, a family of machines, such as photocopiers, laser printers, terminals, etc, could have their own specific aligned corpus, generated by using source files produced for earlier models. Therafter, this corpus could be used for translating the instruction manuals for new models, greatly facilitating this procedure in terms of consistency, reliability and speed of production.

The invention has been described with reference to delimiters being provided by WP commands. Alternatively, other delimiters may be used such as markers provided in a document structuring language such as the Standard Generalised Markup Language or Office Document Architecture. Similarly, typesetting commands may be used as provided in languages such as TEX, LATEX or TROFF.

We claim:

1. Apparatus for linking text in different natural languages, the apparatus comprising:

means for reading a first source file which contains text in a first natural language and control commands for controlling an automatic document process;

means for locating said control commands in said first source file;

means for reading a second source file which contains text in a second natural language and control commands for controlling an automatic document processor;

means for locating said control commands in said second source file;

determining means for determining correspondences between said control commands in said first source file and said control commands in said second source file; and registration means responsive to said determining means for registering within the apparatus a link between a text portion of the first source file located between a pair of said control commands therein and the text portion of the second source file located between the corresponding pair of said control commands therein.

2. The apparatus according to claims 1, wherein said determining means comprises:

means for storing a plurality of identifier codes each corresponding to a respective different one of the control commands and being associated with said respective control command; and means for deriving from the first and second source files respective first and second intermediate files, each intermediate file comprising the contents of the corresponding source file but with the control commands thereof replaced by the respective identifier codes;

and wherein said determining means is operative to determine said correspondences utilizing said identifier codes of said intermediate files.

3. The apparatus according to claim 2, wherein said determining means comprises a differential file comparator operative to compare the contents of the first and second intermediate files to determine said correspondences by locating in each said intermediate file the identifier codes which are the same as those in the other said intermediate file.

4. The apparatus according to claim 1, wherein said determining means comprises a differential file comparator operative to compare the contents of the first and second source files to determine said correspondences by locating in each said source file control commands which are the same as those in the other said source file.

5. The apparatus according to claim 1, wherein said control commands are word processor formatting commands.

6. A method of linking text in different natural languages, the method comprising:

a first reading step of reading a first source file which contains text in a first natural language and control commands for controlling an automatic document processor;

a first locating step of locating said control commands in said first source file;

a second reading step of reading a second source file which contains text in a second natural language and control commands for controlling an automatic document processor;

a second locating step of locating said control commands in said second source file;

a determining step of determining correspondences between said control commands in said first source file and said control commands in said second source file; and a registering step, responsive to said determining step, of registering within the apparatus a link between a text portion of the first source file located between a pair of said control commands therein and the text portion of the second source file located between the corresponding pair of said control commands therein.

7. The method according to claim 6, wherein said determining step comprises:

a storing step of storing a plurality of identifier codes each corresponding to a respective different one of the control commands and being associated with said respective control command; and a deriving step of deriving from the first and second source files respective first and second intermediate file, each intermediate file comprising the contents of the corresponding source file but with the control commands thereof replaced by the respective identifier codes;

and wherein said determining step is operative to determine said correspondences utilizing said identifier codes of said intermediate files.

8. The method according to claims 7, wherein said determining step includes a differential file comparing step of comparing the contents of the first and second intermediate files to determine said correspondences by locating in each said intermediate file the identifier codes which are the same as those in the other said intermediate file.

9. The method according to claim 6, wherein said determining steps includes a differential file comparing step of comparing the contents of the first and second source files to determine said correspondences by locating in each said source file the control commands which are the same as those in the other said source file.

10. The method according to claim 6, wherein said control commands are word processor formatting commands.

11. A computer usable medium having computer readable program code means for causing a computer to link text in different natural languages, the medium comprising:

means for reading a first source file which contains text in a first natural language and control commands for controlling an automatic document process;

means for locating said control commands in said first source file;

means for reading a second source file which contains text in a second natural language and control commands for controlling an automatic document processor;

means for locating said control commands in said second source file;

determining means for determining correspondences between said control commands in said first source file and said control commands in said second source file; and registering means responsive to said determining means for registering within the computer a link between a text portion of the first source file located between a pair of said control commands therein and the text portion of the second source file located between the corresponding pair of said control commands therein.

12. The medium according to claim 11, wherein aid determining means comprises:

means for storing a plurality of identifier codes each corresponding to a respective different one of the control commands and being associated with said respective control command; and means for deriving from the first and second source files respective first and second intermediate files, each intermediate file comprising the contents of the corresponding source file but with the control commands thereof replaced by the respective identifier codes;

and wherein said determining means is operative to determine said correspondences utilizing said identifier codes of said intermediate files.

13. The medium according to claim 12, wherein said determining means comprises a differential file comparator operative to compare the contents of the first and second intermediate files to determine said correspondences by locating in each said intermediate file the identifier codes which are the same as those in the other said intermediate file.

14. The medium according to claim 11, wherein said determining means comprises a differential file comparator operative to compare the contents of the first and second source files to determine said correspondences by locating in each said source file the control commands which are the same as those in the other said source file.

15. The medium according to claim 11, wherein said control commands are word processor formatting commands.

* * * * *

UNITED STATES PATENT AND TRADEMARK OFFICE
CERTIFICATE OF CORRECTION

PATENT NO. : 5,893,134

DATED : April 6, 1999

INVENTOR(S) TIMOTHY F. O'DONOGHUE ET AL.

It is certified that error appears in the above-identified patent and that said Letters Patent is hereby corrected as shown below:

ON TITLE PAGE

[56] References Cited, Other Publications

"Corpa" should read --Corpora--;
"Corpra" should read --Corpora--.

COLUMN 2 line 67, "a" should be deleted.

COLUMN 3 line 3, "straight forward" should read
    --straightforward--;
line 10, "W A Gale and K W" should read --W.A. Gale and
    K.W.--;
line 12, "P F Brown ET Al " should read --P.F. Brown
    et al.--;
line 16, "alignments" should read --alignment--;
line 18, "Et Al)" should read --et al.)--; and
line 22, "Et Al" should read --et al.--.

UNITED STATES PATENT AND TRADEMARK OFFICE
CERTIFICATE OF CORRECTION

PATENT NO.    : 5,893,134

DATED         : April 6, 1999

INVENTOR(S) : TIMOTHY F. O'DONOGHUE ET AL.

It is certified that error appears in the above-identified patent and that said Letters Patent is hereby corrected as shown below:

COLUMN 5 line 39, "to which a corpus is bieng produced to." should read --for which a corpus is being produced.--;

line 42, "terminal-" should read --terminol- --;

line 43, "consistent" should read --consistent;--;

line 45, "terminalogy" should read --the terminology--; and line 56, "de-limited" should read --delimited--.

COLUMN 6 line 31, "textural" should read --textual--.

COLUMN 7 line 15, "text 3" should read
--text 3
  text 4--; and line 39, "language" should read --language;--.

UNITED STATES PATENT AND TRADEMARK OFFICE
CERTIFICATE OF CORRECTION

PATENT NO.  : 5,893,134

DATED       : April 6, 1999

INVENTOR(S) : TIMOTHY F. O'DONOGHUE ET AL.

It is certified that error appears in the above-identified patent and that said Letters Patent is hereby corrected as shown below:

COLUMN 8

```
line 19, "whether the" should read --whether, with respect
         to the--and;
line 67 "required" should read --require--.
```

COLUMN 9

```
line 48, "if" should read --is--.
```

COLUMN 10

```
line 1, "etc," should read --etc.,--.
line 35 "claims 1," should read --claim 1--.
```

COLUMN 11

```
line 39, "claims 7," should read --claim 7,--; and
line 46, "steps" should read --step--.
```

UNITED STATES PATENT AND TRADEMARK OFFICE
CERTIFICATE OF CORRECTION

PATENT NO. : 5,893,134

DATED : April 6, 1999

INVENTOR(S) : TIMOTHY . O'DONOGHUE ET AL.

It is certified that error appears in the above-identified patent and that said Letters Patent is hereby corrected as shown below:

COLUMN 12 line 22, "aid'" should read --said--.

Signed and Sealed this

Fifteenth Day of February, 2000

Attest:

Q. TODD DICKINSON

*Attesting Officer*   *Commissioner of Patents and Trademarks*